(12) United States Patent
Pinho

(10) Patent No.: US 7,230,768 B2
(45) Date of Patent: Jun. 12, 2007

(54) ULTRA-BRIGHT LIGHT ENGINE FOR PROJECTION DISPLAYS

(75) Inventor: George P. Pinho, Waterloo (CA)

(73) Assignee: Christie Digital Systems Inc., Ontario (CA)

( * ) Notice: Subject to any disclaimer, the term of this patent is extended or adjusted under 35 U.S.C. 154(b) by 23 days.

(21) Appl. No.: 11/115,311

(22) Filed: Apr. 27, 2005

(65) Prior Publication Data

US 2006/0245069 A1 Nov. 2, 2006

(51) Int. Cl.
- G02B 27/14 (2006.01)
- G02B 27/10 (2006.01)
- G02B 1/10 (2006.01)
- G03B 21/14 (2006.01)
- G03B 21/00 (2006.01)

(52) U.S. Cl. ............ 359/634; 359/618; 359/580; 359/583; 359/586; 359/587; 353/20; 353/31

(58) Field of Classification Search ............ 359/618, 359/629, 634, 638, 640, 580, 583, 586–589; 353/20, 31, 33, 34, 81
See application file for complete search history.

(56) References Cited

U.S. PATENT DOCUMENTS

| | | | | |
|---|---|---|---|---|
| 2,749,792 A | * | 6/1956 | Kelly | 359/583 |
| 3,739,080 A | * | 6/1973 | Bachmann | 348/259 |
| 5,044,727 A | * | 9/1991 | Steinle | 359/637 |
| 5,786,937 A | * | 7/1998 | Chu et al. | 359/583 |
| 5,914,817 A | * | 6/1999 | Browning et al. | 359/634 |
| 5,986,815 A | * | 11/1999 | Bryars | 359/634 |
| 5,999,321 A | | 12/1999 | Bradley | 359/587 |
| 6,144,498 A | * | 11/2000 | Bryars et al. | 359/634 |
| 6,340,230 B1 | * | 1/2002 | Bryars et al. | 353/31 |
| 6,398,364 B1 | * | 6/2002 | Bryars | 353/31 |
| 6,511,183 B2 | * | 1/2003 | Shimizu et al. | 353/20 |
| 7,079,209 B2 | * | 7/2006 | Nakagawa | 349/119 |
| 2005/0225730 A1 | | 10/2005 | Sannohe | |

FOREIGN PATENT DOCUMENTS

| | | |
|---|---|---|
| EP | 1 227 358 A2 | 7/2002 |
| JP | 11-202127 | 7/1999 |

OTHER PUBLICATIONS

PCT International Search Report mailed Aug. 10, 2006, in PCT International Application No. PCT/CA2006/00686 (3 pages).

* cited by examiner

*Primary Examiner*—Loha Ben
(74) *Attorney, Agent, or Firm*—Staas & Halsey LLP

(57) ABSTRACT

A projector incorporating a prism and a plurality of light valves for modulating light that passes though the prism, wherein the color splitting-converging prism includes a dichroic coating having multiple layers of high and low index of refraction and ¼ wavelength thickness at each desired angle of incidence for reducing dichroic shift and thereby minimizing light loss.

14 Claims, 8 Drawing Sheets

ULTRA-BRIGHT LIGHT ENGINE FOR PROJECTION DISPLAYS

BACKGROUND OF THE INVENTION

1. Field of the Invention

The present invention is directed to digital projectors incorporating light engines with color splitting-converging prisms, and more particularly to a color splitting-converging prism incorporating a coating for reducing dichroic shift and thereby minimizing light loss.

2. Description of the Related Art

A typical color digital projector consists of a lamp, an illumination system, and a color splitting-recombining prism. Attached to the prism is an imaging device, typically a digital micromirror device (DMD) panel. The imaging device receives a light cone from the lamp and modulates the light to create an image on the screen.

The DMD is an electromechanical device consisting of millions of microscopic mirrors that modulates light by independently flipping each mirror through a +−12 degree angle. The design of the DMD requires creation of a light cone with an f/# 2.4–2.5 for maximum light throughput in the projector. Using three such DMDs on a prism (e.g. Phillips® prism, plumbicon, etc.), a white light cone of f/2.4 can be separated into red, green, and blue. Each color is individually modulated by the DMD and then recombined by the prism.

The design of the plumbicon prism requires that the dichroic coatings be designed for large angles of incidence relative to normal (i.e. 90°). Typically, the dichroic coatings are designed for angles of 12–59 degrees from the normal incident ray. When light of f/2.4 strikes such a coating the dichroic shift is large above 20 degrees AOI. The dichroic shift limits the collection efficiency for light rays in the range of from approximately 30–59 degrees. This lowers the efficiency of light transmission in the prism and contributes to increased heating of the prism.

Accordingly, it is an objective of the present invention to provide a prism that reduces dichroic shift and thereby increases light transmission efficiency.

SUMMARY OF THE INVENTION

Therefore, according to an aspect of the present invention a dichroic coating is provided for a prism, having multiple layers of high and low index of refraction and ¼ wavelength thickness at each desired angle of incidence.

These together with other aspects and advantages that will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
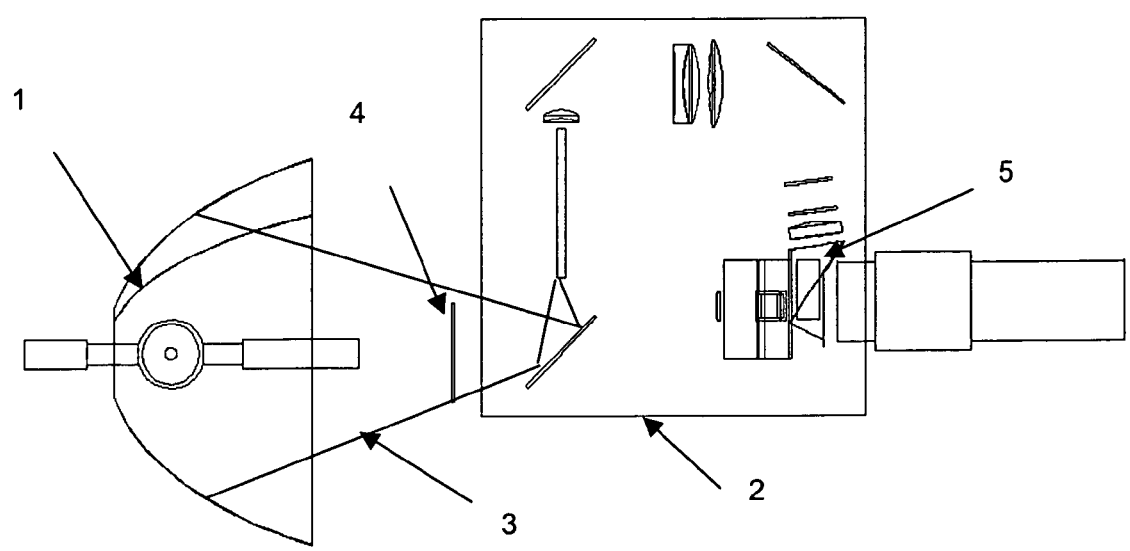
FIG. 1 is a digital three-chip projector, according to the prior art.
Figure 2:
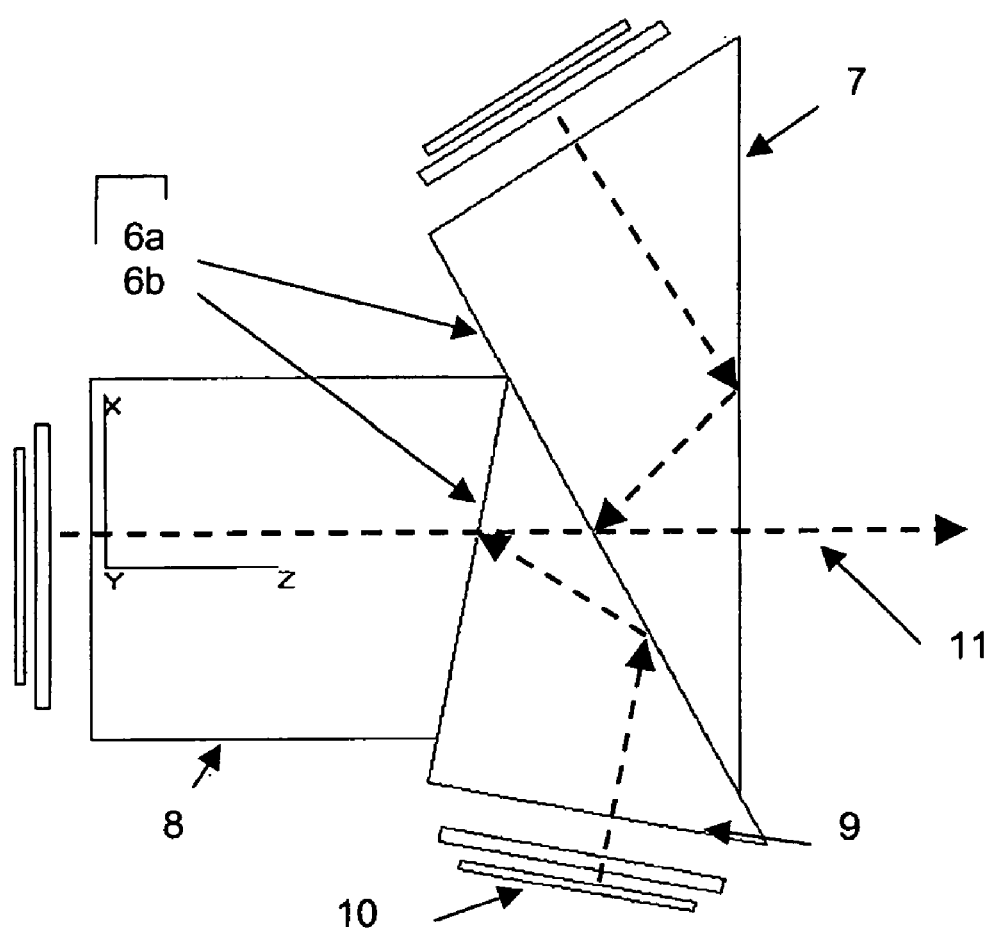
FIG. 2 is a schematic representation of a plumbicon prism used for DMD panel display devices, according to the prior art.

FIG. 1 shows a typical three-chip projector comprising a Xenon lamp and parabolic reflector (1) for creating a light cone (3) that passes through a UV filter (4) into an illumination system (2), including an integrator rod and lenses for telecentric illumination. A color splitting-converging prism (5) typically comprises a plumbicon prism (for DMD panels) as shown in FIG. 2. The prism elements contain dichroic coatings (6) to separate the incoming white light into blue (7), green (8), and red (9), as discussed in greater detail below. Each color is then separately modulated at each display device or light valve (10), such as by a DMD. The terms "display device" and "light valve" are used interchangeably throughout this disclosure. The display devices reflect the modulated light, which is re-converged (11) by the prism and projected by a projection lens onto a screen to produce an image. In the three-chip design, convergence mechanisms are placed on the display devices to assist in field alignment in the event that the unit develops misconvergence of color.

Figure 3:
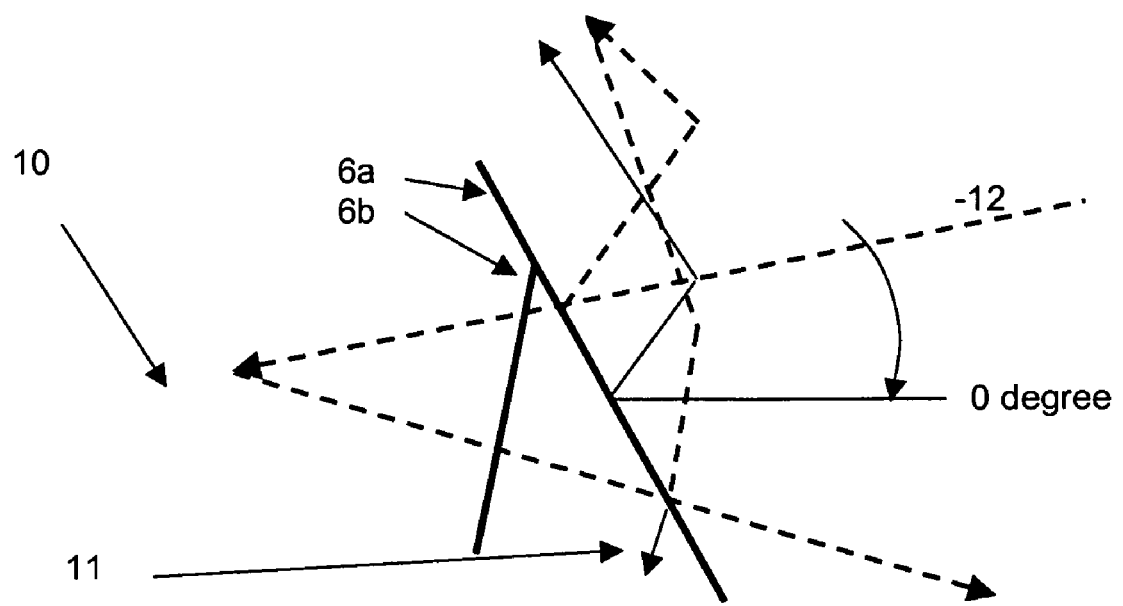
FIG. 3 is a schematic representation of the plumbicon prism of FIG. 2, showing blue and red dichroic filter coatings and the path of a light ray at 12 degrees to the normal.

As discussed above, DMD (10) is an electromechanical device consisting of millions of microscopic mirrors that modulate light by independently flipping each mirror through a +−12 degree angle. FIG. 3 shows a top view of a 3-chip prism with blue and red dichroic filter coatings, 6a and 6b, and the path that a f/2.4 light cone takes towards the DMD (10) on the blue channel. The dotted edge ray of the light cone represents an angle of 12 degrees to the normal ray (shown for blue and green only) and is equivalent to the tilt angle of the DMD (10). Reference numeral (11) represents light trapped as a result of dichroic shift on the return path.

The design of the plumbicon prism requires that the dichroic coatings (6) be at large angles relative to the normal. Typically, the dichroic coatings range in angles of 49–59 degrees from the normal ray (0 degrees) for the blue coating (6a) and 12–30 degrees for the red coating (6b) in FIG. 3. When light of f/2.4 strikes such a coating the dichroic shift is large between the 0 and 12 degree incident rays in FIG. 3 and as shown in FIGS. 4a and 4b, for blue and red prism coatings, respectively.

Figure 5:
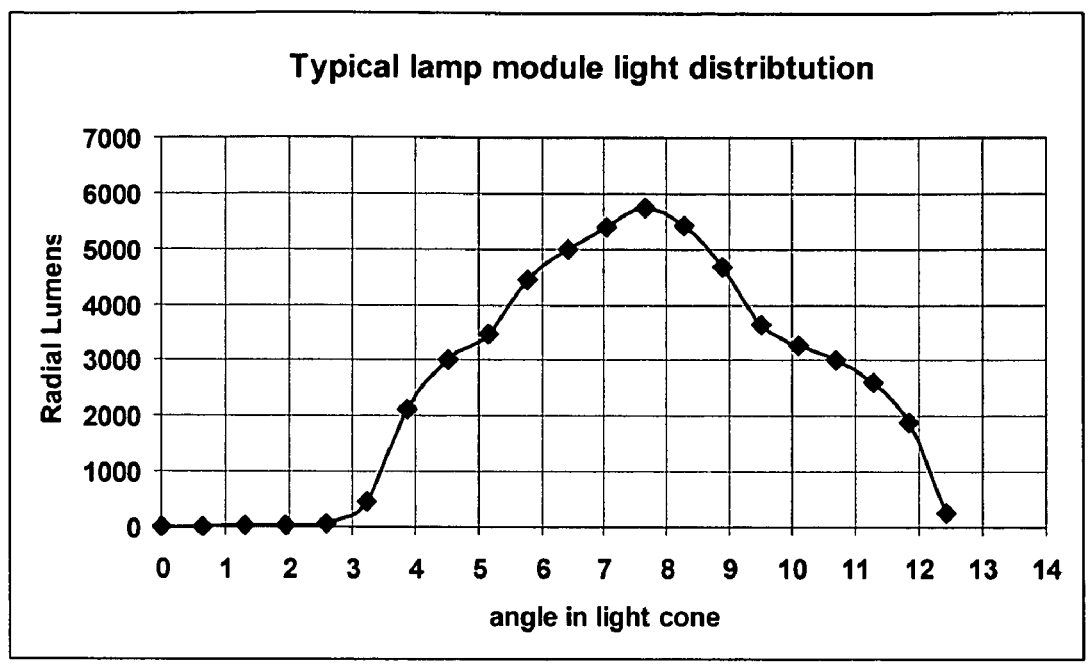
FIG. 5 shows a typical distribution of light in the light cone entering the prism of FIGS. 2 and 3.

Also, as discussed above, the efficiency of light transmission through the projector is affected by the distribution of light from the lamp module (1). The typical lamp module for a DMD projector is designed to produce a light cone (3) in the range of f/1.0 to f/1.5 depending on the lamp. Magnification by the illumination system (2) changes the f/# of the light cone to match the characteristics of the DMD (10) while preserving Etendue. The distribution of light rays in the light cone (3) on the prism (5) depends on the arc-gap of the lamp, the lamp power, and the reflector that is used to form the light cone. FIG. 5 depicts the distribution of light from a typical lamp and reflector within the light cone (3).

Figure 4A:
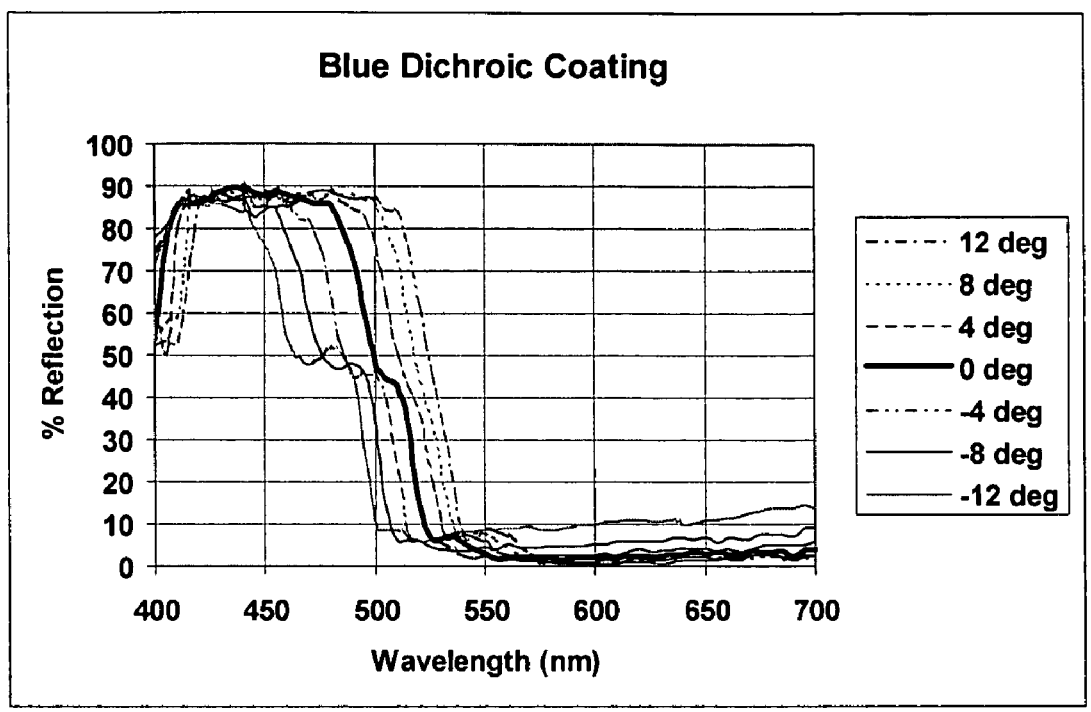
FIG. 4a shows typical dichroic shift for light rays incident on a blue dichroic coating at angles ranging from −12° to +12° to the normal.
Figure 4B:
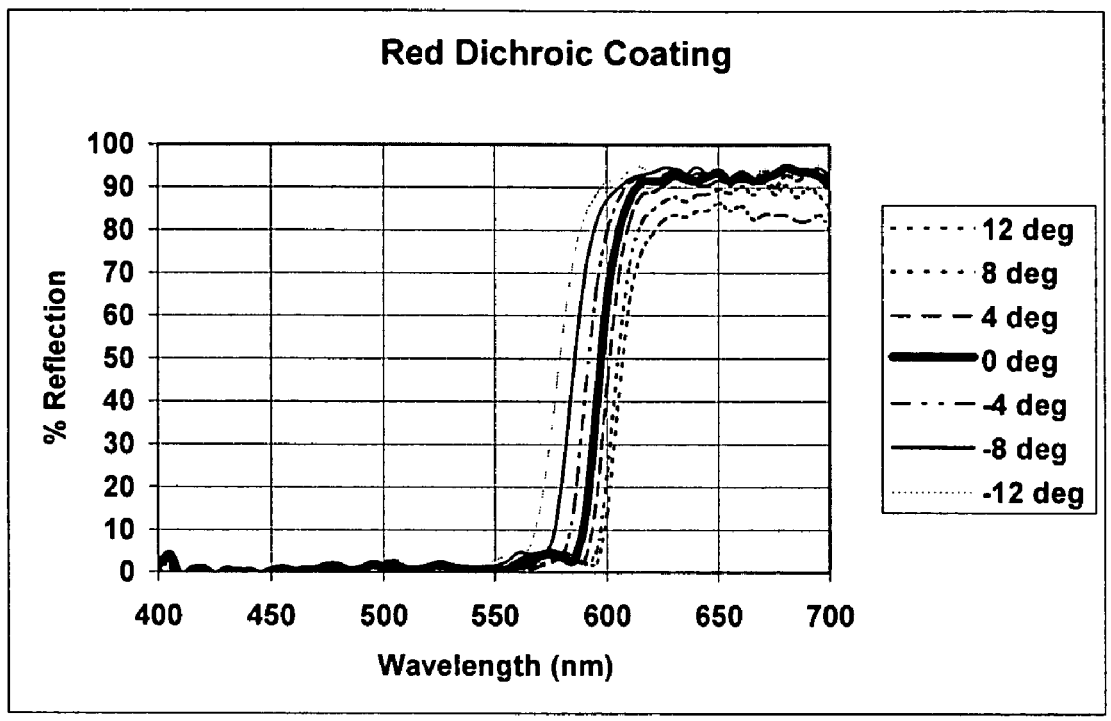
FIG. 4b shows typical dichroic shift for light rays incident on a red dichroic coating at angles ranging from −12° to +12° to the normal.

The dichroic shift shown in FIGS. 4*a* and 4*b* limits the collection efficiency for light rays incident in the range 9–12 degrees. A ray from the lamp (1) at −12° (FIG. 4) experiences a large dichroic shift at the coating, as shown in FIG. 4*a*. The large shift allows only wavelengths from 400–450 nm to strike the blue DMD (10). The rest of the light is transmitted to the green and red DMD's. Upon reflection, the rays emerge at an angle of +12°. The light rays reflected from the blue DMD are efficiently reflected to the projection lens, but the large dichroic shift in the opposite direction traps the light rays reflected from the green DMD (11). This lowers the efficiency of light transmission in the prism (5) and contributes to increased heating of the prism. A similar condition occurs at the red dichroic coatings.

The effect of dichroic shift in the prism (5) lowers transmission of light at the oblique angles of incidence. For a typical lamp (1) this causes increased heating in the prism and a reduction in projector efficiency by as much as 25%.

Therefore, in accordance with the present invention novel coatings are provided for dramatically reducing dichroic shift and therefore reducing light loss in the prism (5). The design of the coatings requires additional layers to achieve the desired effect. According to the preferred embodiment, the following coating formulations were created:

Blue dichroic coating design

| Thickness (um) | Material |
| --- | --- |
| 0.19066 | MgF2 |
| 0.022637 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.022637 | TiO2 |
| 0.020536 | TiO2 |
| 0.06900095 | SiO2 |
| 0.0425814 | TiO2 |
| 0.06900095 | SiO2 |
| 0.0425814 | TiO2 |
| 0.06900095 | SiO2 |
| 0.020536 | TiO2 |

Red dichroic coating design

| Thickness (um) | Material |
| --- | --- |
| 0.06514 | SiO2 |
| 0.0803862 | TiO2 |
| 0.1302744 | SiO2 |
| 0.0803862 | TiO2 |
| 0.06514 | SiO2 |
| 0.061165 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.061165 | SiO2 |
| 0.06514 | SiO2 |
| 0.0803862 | TiO2 |
| 0.1302744 | SiO2 |
| 0.0803862 | TiO2 |
| 0.06514 | SiO2 |
| 0.083546 | MgF2 |
| 0.109806 | ZrO2 |
| 0.0707337 | Al2O3 |

Each coating uses TiO2 and SiO2 as the high and low index materials. Specifically, TiO2 has an index of refraction 2.32 and SiO2, an index of refraction 1.46. In addition, matching layers are used at each end of the coating (i.e. the different materials and thicknesses used in the first 4–6 layers and the last 8–9 layers). This helps to match the index of refraction of the coating layers to the air side or the glass side and define the wavelength edges of the dichroic coatings to achieve the correct band pass.

Figure 6:
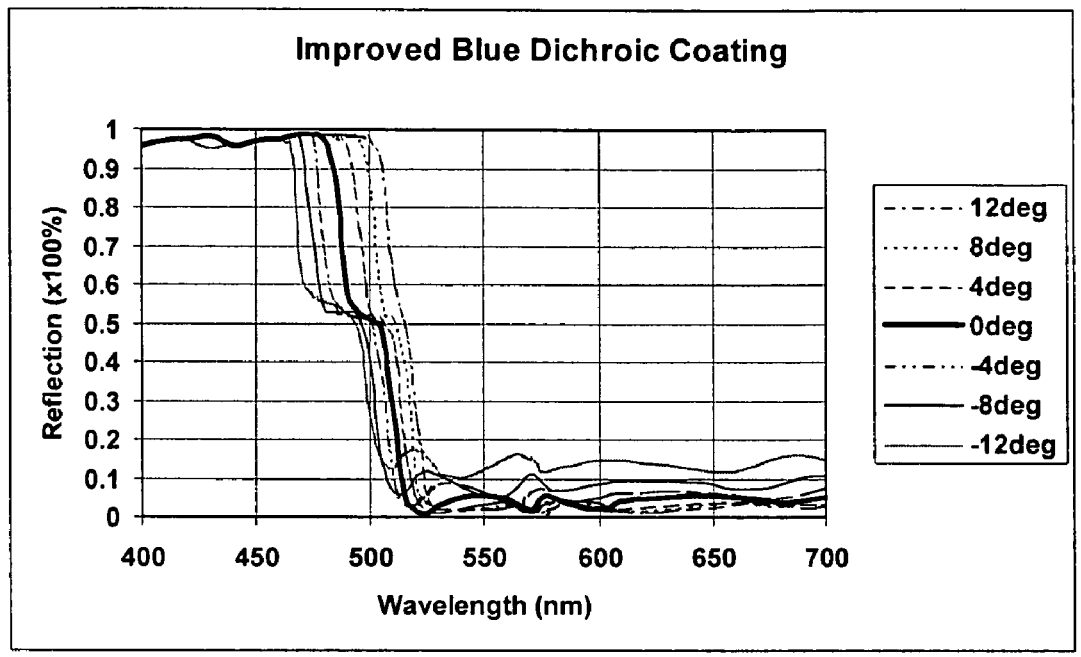
FIGS. 6 and 7 show the dichroic shift for light rays incident on a blue dichroic coating (FIG. 6) and a red dichroic coating (FIG. 7), according to the present invention, at angles ranging from −12° to +12° to the normal.
Figure 7:
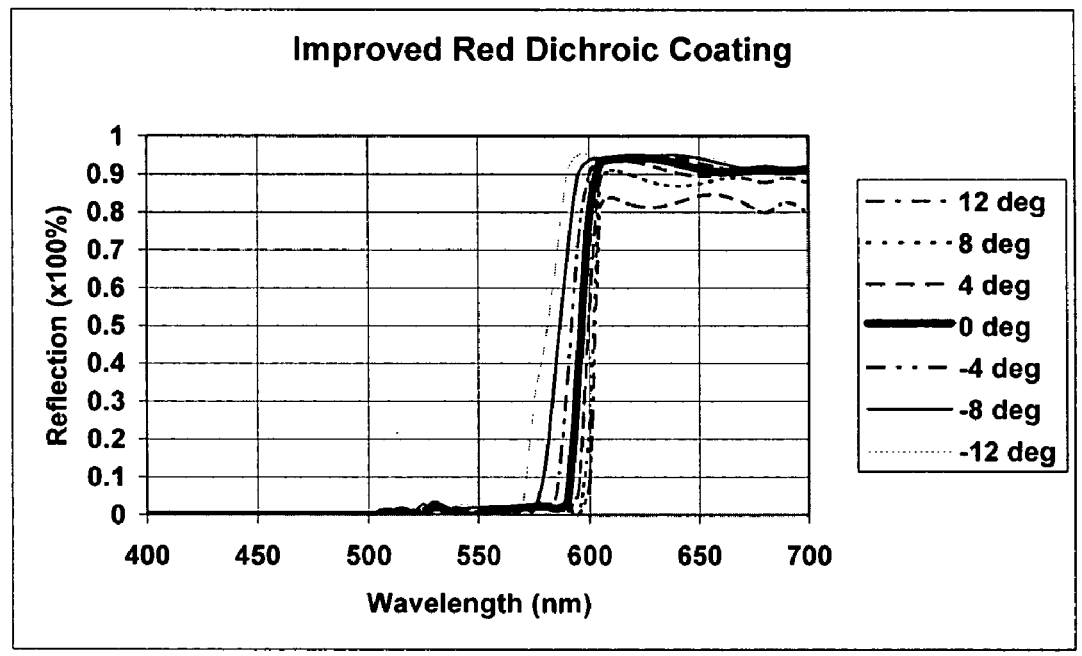

The dichroic shift in FIG. 6 has been reduced to 35 nm at 50% R from the 65 nm @50% R in FIG. 4*a*. In FIG. 7, the shift has been reduced to 23 nm at 50% R from 35 nm @50% R in FIG. 4*b*. This reduction in dichroic shift is the single most important factor in increasing the light transmission through the prism (5). The light rays from 9–12 degrees in the configuration of FIG. 3 experience lower reflection loss within the prism using the novel dichroic coatings of the present invention.

According to another important aspect of the present invention, the steepness of the cut-off at 0 degree is increased for both the blue and red coatings. When the slope of the cut-off for each coating is increased, light in the transition zone between reflection and transmission is better separated into its respective channel. In FIG. 6 the slope of the cut-off has been changed from −2% R/nm to −6% R/nm while in FIG. 7 the slope has been changed from 4% R/nm to 8% R/nm.

According to yet a further aspect of the invention, reflection in the blue and red portions of the spectrum is increased while reducing reflection in the green portion. Measurements have shown an increase in the blue reflection from 90% to 97% and an increase for red from 91% to 93%.

In terms of explaining the manner by which the multi-layer coatings of the present invention function to reduce dichroic shift, it is necessary to consider the theory of muli-layer thin films. A person of skill in the art will understand that an electromagnetic wave incident on a surface of refractive index n1 must satisfy the boundary condition that the magnetic and electric fields be continuous at each interface.

Figure 8:
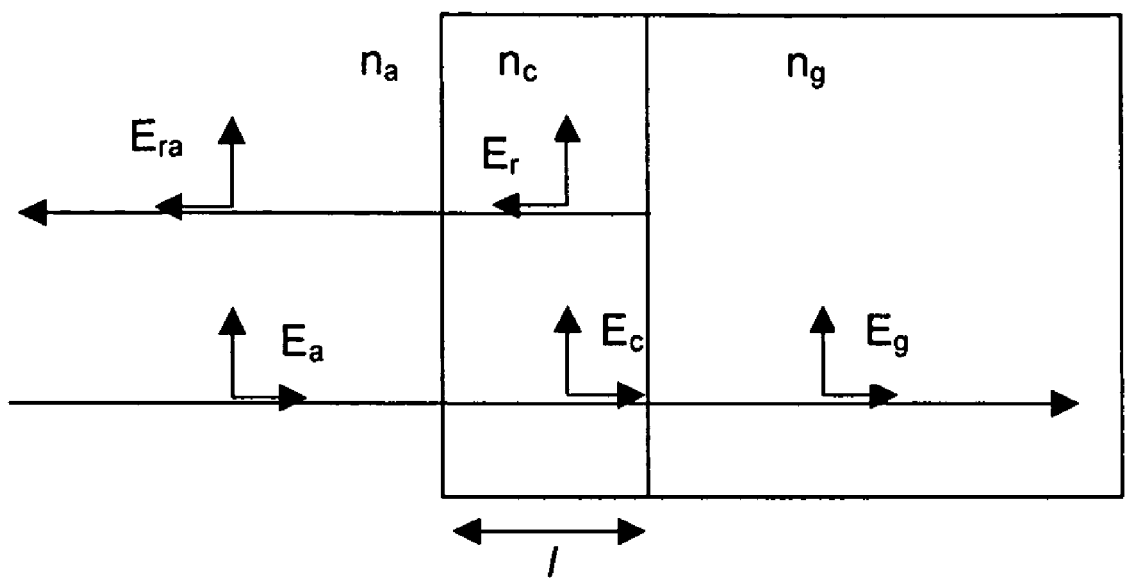
FIG. 8 is a schematic representation of electromagnetic waves incident on a multi-layer thin film coating, as used in the present invention.

In FIG. 8, E represents the electric field vector that is transmitted or reflected in each medium of different index of refraction, and the medium between air and glass represents a coating of thickness l. Since the fields must be continuous, the boundary condition may be solved to obtain:

$$\begin{bmatrix} 1 \\ n_a \end{bmatrix} + \begin{bmatrix} 1 \\ -n_a \end{bmatrix} \frac{E_{ra}}{E_a} = \begin{bmatrix} \cos kl & \frac{-i}{n}\sin kl \\ -in\sin kl & \cos kl \end{bmatrix} \begin{bmatrix} 1 \\ n_g \end{bmatrix} \frac{E_g}{E_a}. \quad (1)$$

In the above equation, kl represents the phase factor and k is equal to:

$$k = 2\pi \frac{n}{\lambda} \cos\theta \quad (2)$$

where $\theta$ is the angle of incidence on the coating and n represents the index of refraction of the coating layer for s or p-polarization and is equivalent to:

$n = n_s = n_c \cos\theta$ for s-polarization and, $$n = n_p = \frac{n_c}{\cos\theta}$$

for p-polarization.

These equations show that a dichroic shift between the s and p-polarization will occur at high angles of incidence. As previously discussed, shifts become large above 20 degrees AOI.

The reflection and transmission coefficients are equal to:

$$r = \frac{E_{ra}}{E_a}, t = \frac{E_g}{E_a}.$$

Therefore, equation (1) represents the transmission and reflection of light at the coating interface, which is seen to be dependent on the wavelength of the light, the index of refraction of the coating and the thickness of the coating.

For multi-layer coatings, each coating has its own transfer matrix and equation 1 can be written as:

$$\begin{bmatrix} 1 \\ n_a \end{bmatrix} + \begin{bmatrix} 1 \\ -n_a \end{bmatrix} r = M_1 M_2 M_3 \ldots M_N \begin{bmatrix} 1 \\ n_g \end{bmatrix} t$$

where M represents the transfer matrix for each coating.

In order to create coatings with high reflectance and specific cut off bands, according to the invention, stacks of alternating layers of high and low index of refraction are deposited as discussed above with layer thicknesses that are ¼ wavelength at a desired angle of incidence. The layer thicknesses of ¼ wavelength are required to obtain a phase factor equal to $\pi$ or 180 degrees, as per equation 2. This creates destructive interference between reflected and transmitted waves at the coatings and permits the design of coatings that are wavelength selective and have high reflectance. For an alternating stack on N layers with index of refraction, $n_H$ and $n_L$, equation (1) can be re-written as:

$$\begin{bmatrix} 1 \\ n_a \end{bmatrix} + \begin{bmatrix} 1 \\ -n_a \end{bmatrix} r = \begin{bmatrix} \left(\frac{-n_H}{n_L}\right)^N & 0 \\ 0 & \left(\frac{-n_L}{n_H}\right)^N \end{bmatrix} \begin{bmatrix} 1 \\ n_g \end{bmatrix} t.$$

Increasing the number of layers results in an increase in reflectivity. Typically, 20–30 layers are chosen for highly reflective stacks. To broaden the reflective regions or change the cut-offs for a reflective coating at various angles of incidence, different thickness layers can be added to the alternating stack to control cut-offs and angle of incidence sensitivity.

To minimize dichroic shift, the thicknesses of the layers are calculated from equation (2) at the mean angles of incidence for the dichroic coating. For example, the mean angle of incidence for the blue dichroic coating is 53.5 degrees. In addition, a match angle can be used which allows for a design to be matched to one angle, $\alpha$, but used at another, $\beta$. Equation (2) can be re-written as:

$$k = 2\pi \frac{n}{\lambda} \cos\beta \frac{\sqrt{1-(n_a \sin\alpha/n)^2}}{\sqrt{1-(n_a \sin\beta/n)^2}}. \quad (3)$$

In using this equation, the layer thickness is chosen to reduce the dichroic shift to a desired value. In addition, the index of refraction is chosen to be as high as practically possible to further reduce the dichroic shift.

A successful prototype of the invention applied to a prism within a projector utilizing a 2.4 kW bubble lamp with the light distribution of FIG. 4, yielded the following improvements in light output:

| Coating design | Projector ANSI lumens |
|---|---|
| Standard dichroic coating | 13500 |
| Improved dichroic coating | 16875 |

The measured 25% improvement in light output are believed to be achievable only with the novel coatings set forth above.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. For use in a projector incorporating a light engine with color splitting-converging prism, said prism having at least two prism elements wherein a first prism element comprises a red dichroic coating, a second prism element comprises a blue dichroic coating, the improvement comprising application of red and blue dichroic coatings to said respective prism elements, said coatings being characterized by respective reflectance per wavelength slopes steeper than −2% R/nm and 4% R/nm, respectively, for optimizing color separation within said prism and thereby increasing light throughput.

2. The improvement of claim 1, wherein said respective reflectance per wavelength slopes are −6% R/nm and 8% R/nm, respectively.

3. The improvement of claim 1, wherein said coatings consist of stacks of alternating layers of high and low index of refraction with layer thicknesses equivalent to ¼ wavelength at specific angles of incidence.

4. The improvement of claim 3, wherein said coatings comprise 20 to 30 of said layers.

5. The improvement of claim 1, wherein said dichroic coatings comprise alternating layers of TiO2 and SiO2.

6. The improvement of claim 5, wherein said dichroic coating for the color blue is comprised of:

| Thickness (um) | Material |
| --- | --- |
| 0.19066 | MgF2 |
| 0.022637 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.022637 | TiO2 |
| 0.020536 | TiO2 |
| 0.06900095 | SiO2 |
| 0.0425814 | TiO2 |
| 0.06900095 | SiO2 |
| 0.0425814 | TiO2 |
| 0.06900095 | SiO2 |
| 0.020536 | TiO2 |

7. The improvement of claim 5, wherein said dichroic coating for the color red is comprised of:

| Thickness (um) | Material |
| --- | --- |
| 0.06514 | SiO2 |
| 0.0803862 | TiO2 |
| 0.1302744 | SiO2 |
| 0.0803862 | TiO2 |
| 0.06514 | SiO2 |
| 0.061165 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.061165 | SiO2 |
| 0.06514 | SiO2 |
| 0.0803862 | TiO2 |
| 0.1302744 | SiO2 |
| 0.0803862 | TiO2 |
| 0.06514 | SiO2 |
| 0.083546 | MgF2 |
| 0.109806 | ZrO2 |
| 0.0707337 | Al2O3 |

8. The improvement of claim 1, wherein said coatings are further characterized by having respective dichroic shifts less than first and second predetermined amounts, for minimizing light loss and thereby increasing light throughput.

9. The improvement of claim 8, wherein said first and second predetermined amounts are 65 nm and 35 nm, respectively.

10. The improvement of claim 1, wherein said coatings consist of multiple layers of high and low index of refraction and index matching layers, wherein layer thicknesses and materials for said multiple layers are chosen to provide prism dichroic coatings with dichroic shifts of less than 65 nm and less than 35 nm for blue and red, respectively, and thereby increase light throughput.

11. The improvement of claim 10, wherein said dichroic coatings comprise alternating layers of TiO2 and SiO2.

12. The improvement of claim 10, wherein said layer thicknesses and materials for said multiple layers are chosen to provide prism dichroic coatings with dichroic shifts of approximately 35 nm and 23 nm for blue and red, respectively.

13. Use of the improvement according to claim 1 in a 3-chip DMD projector utilizing one of either a Xe or UHP lamp with f#1.0–1.5.

14. Use of the improvement according to claim 1 in at least a 5-element prism within a 3-chip DMD projector.

* * * * *